United States Patent
Günzel et al.

(10) Patent No.: US 6,262,762 B1
(45) Date of Patent: Jul. 17, 2001

(54) FILM SCANNER WITH SCALING SIGNAL

(75) Inventors: Wolfgang Günzel, Pfungstadt; Peter Bachmann, Leidersbach, both of (DE)

(73) Assignee: U.S. Philips Corporation, New York, NY (US)

( * ) Notice: Subject to any disclaimer, the term of this patent is extended or adjusted under 35 U.S.C. 154(b) by 419 days.

(21) Appl. No.: 08/767,734

(22) Filed: Dec. 16, 1996

(30) Foreign Application Priority Data

Dec. 23, 1995 (DE) .............................................. 195 48 626

(51) Int. Cl.⁷ ....................................................... H04N 3/36
(52) U.S. Cl. ............................................................... 348/97
(58) Field of Search ................................ 348/96–98, 221, 348/364; 358/505–507; 355/32, 35; 386/42, 128–130; H04N 7/18, 3/36

(56) References Cited

U.S. PATENT DOCUMENTS

| | | | |
|---|---|---|---|
| 4,418,358 | * 11/1983 | Poetsch et al. | 348/96 |
| 5,329,362 | * 7/1994 | Takaiwa | 348/96 |
| 5,428,387 | * 6/1995 | Galt et al. | 348/97 |
| 5,469,209 | * 11/1995 | Gunday et al. | 348/97 |
| 5,623,303 | * 4/1997 | Inoue et al. | 348/96 |
| 5,640,201 | * 6/1997 | Inuiya | 348/98 |
| 5,644,356 | * 7/1997 | Swinson et al. | 348/96 |
| 5,699,144 | * 12/1997 | Takagi | 355/35 |
| 5,729,284 | * 3/1998 | Ishii et al. | 348/96 |

* cited by examiner

Primary Examiner—Richard Lee
(74) Attorney, Agent, or Firm—Michael E. Belk

(57) ABSTRACT

A scanner, in which the contents of an film frame (1) are converted into a video signal by opto-electronic converters (4), this video signal being post-processed in a video processing stage (12). The operation of post-processing the video signal may be monitored by an oscilloscope (25). In order that this monitoring can be carried out in a simple manner, a scaling signal is inserted into the video signal before the video processing stage (12) so that the video signal to be monitored and a scaling signal line are simultaneously displayed on the screen of, for example, the oscilloscope (25).

17 Claims, 2 Drawing Sheets

FILM SCANNER WITH SCALING SIGNAL

BACKGROUND OF THE INVENTION

1. Field of the Invention

The invention relates to a scanner comprising means for converting the contents of a film frame into a video signal, means for post-processing the video signal and means for monitoring the post-processing result.

2. Description of the Related Art

Scanners having the features mentioned are used, for example, for storing the contents of lantern slides on magnetic storage means. A similar possibility of use is to store the contents of frames of a cinematographic film on video magnetic tapes, i.e., to make a copy of the cinematographic film in the form of a video film.

This transformation of the picture information from a record carrier to another requires a steady check in order that the quality of the copy is as similar as possible to that of the original. For example, when copying a color film, the color components in the video signal must be retuned. Other parameters of the video signal such as, for example, resolution, setup interval, gamma, white balance, drive and contour enhancement should also be monitored and, if necessary, changed.

These parameter values are performed at different positions (checkpoints) of the above-mentioned device for post-processing the video signal and applied, via a measuring crossbar, to a display apparatus such as, for example, an oscilloscope or a monitor.

An important parameter is the drive of the converter elements and their preamplifiers, i.e., those means with which a frame is converted into a corresponding amplified video signal. These means are, for example, opto-electronic converters such as solid-state sensors (CCDs) or pick-up tubes. Other means for this purpose are photomultipliers which convert a light beam modulated by the picture and generated by the electron beam of a flying spot tube into the video signal.

To optimize the drive of these elements, the intensity of the light in the first of the above-mentioned cases, or the intensity of the electron beam in the second case, should be increased or decreased. To control the drive, an input of the crossbar is connected to a checkpoint directly behind the converter. Since it is often necessary to change the drive of the opto-electronic converter simultaneously with the change of the video signal parameters, the crossbar should consequently be switched continually back and forth. In digital systems, a complicated D/A conversion dependent on the data format must be performed per checkpoint, because the picture is shown on the oscilloscope or the monitor in an analog form. This involves quite a considerable temporal and circuit-technical cost and a large number of components, which is normally not justifiable.

SUMMARY OF THE INVENTION

It is therefore an object of the invention to reduce the number of components for post-processing in a scanner of the type described in the opening paragraph.

This object is solved in that means are provided for inserting a scaling signal into the video signal before post-processing said video signal.

The invention has the advantage that the drive of the opto-electronic converter and the A/D converter can be checked in each position of the crossbar. Thus, a transparency of the light current setting in color correction and other level manipulations is achieved during the entire process of amplification.

These and other aspects of the invention will be apparent from and elucidated with reference to the embodiments described hereinafter.

DESCRIPTION OF THE PREFERRED EMBODIMENTS

Figure 1A:
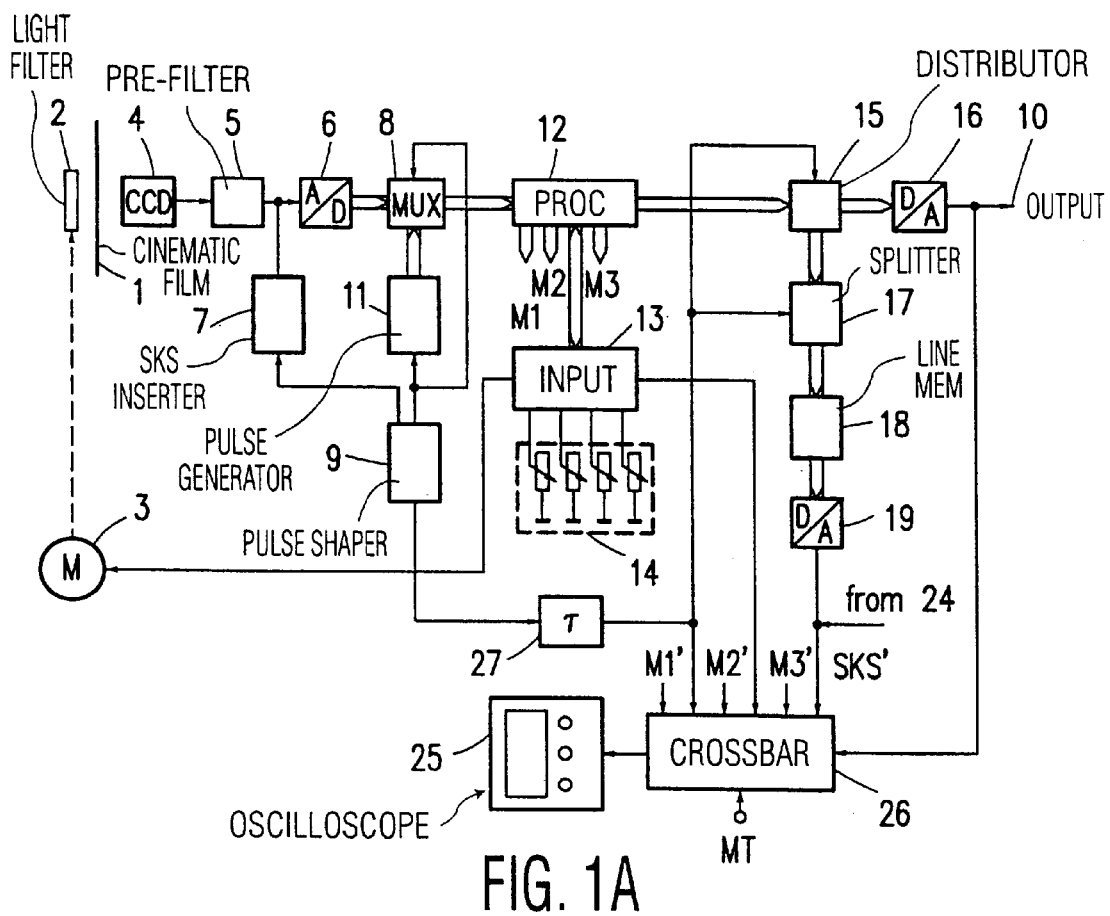
FIG. 1A shows the circuit diagram of a telecine scanner having the inventive features.

In the telecine scanner shown in FIG. 1A the frames of a cinematographic film 1 are converted into video signals (R, G, B or Y, $C_R$, $C_B$), which can be derived from an output 10 after they have been post-processed. The film 1 is illuminated with light which has previously passed a diaphragm or optic light filter 2. By adjusting the optic light filter 2 with the aid of a controllable servomotor 3, the intensity of the light incident on the film 1 is changed. With this change, also the drive of the opto-electronic sensors 4, for example, CCDs, is changed, having their output signal applied to the input of a preamplifier 5. The video signal from the sensors 4 and amplified by the preamplifier 5 is digitized by an A/D converter 6.

For inserting a scaling signal SKS into the video signal according to the invention, either an analog inserter circuit 7 is arranged in the analog signal branch before the A/D converter 6, or a multiplexer 8 is provided in the digital signal branch after the A/D converter 6. Both the inserter circuit 7 and the multiplexer 8 may be controlled by a pulse shaper 9 in such a way that the scaling signal SKS is written in a test line of the video signal. The pulse shaper 9 counts the horizontal frequency pulses of the video signal and then controls either a pulse generator incorporated in the inserter circuit 7 or the pulse generator 11 which applies the scaling signal SKS to the multiplexer 8, so that, for example, in the 625 line standard, the video signal is transmitted from the A/D converter 6 during 624 lines and the scaling signal SKS is transmitted from the pulse generator 11 during one line. This scaling signal SKS is now treated as the normal video signal by the subsequent digital signal processor 12 representing an amplifier operation.

In the relevant example, the scaling signal SKS consists of a bit combination which represents the 100% level of the A/D converter 6. It is changed by the digital signal processor 12 in the same way as all other data of the video signal. The video signal data which are to be changed are transmitted by an input device 13 to the signal processor 12. To change the video data, symbolically denoted control elements 14 for the color components R, G, B of the video signal and for the intensity of the light incident on the film 1 are provided.

Figure 1B:
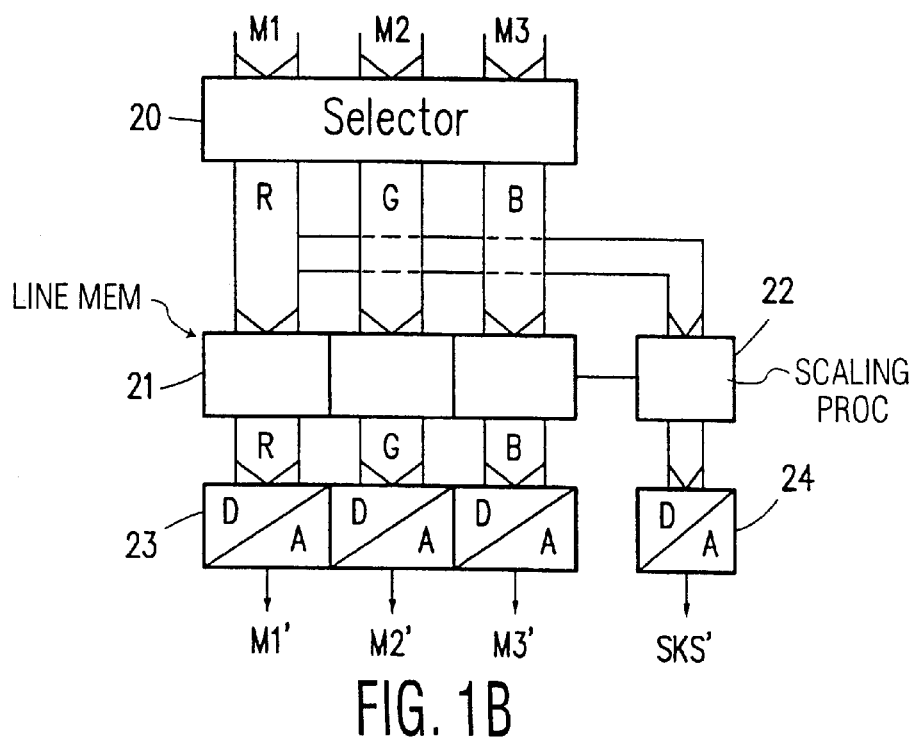
FIG. 1B is a block diagram of the checkpoint signal processing.

To monitor the video signal to be processed by the signal processor 12, several checkpoints at several positions of the circuit of the signal processor 12 are provided, whose outputs are denoted by M1, M2, M3. Video signals R, G, B can be taken in time multiplex from these checkpoint signal outputs M1 to M3. In accordance with FIG. 1B, these signals may be applied to the inputs of a selector 20, from whose outputs the signals RGB derived from the relevant switched signal can be taken. These RGB signals are now applied to a line memory 21 and to a scaling signal processing stage 22.

The line memories 21 provide the possibility of multiplying the RGB signal lines and thus increase the luminance of the display on the screen of the picture display apparatus. In the scaling signal processing stage 22, the scaling signal SKS is separated from the RGB video signals and simultaneously also multiplied line-sequentially by means of a line memory for the purpose of increasing the luminance.

Figure 2:
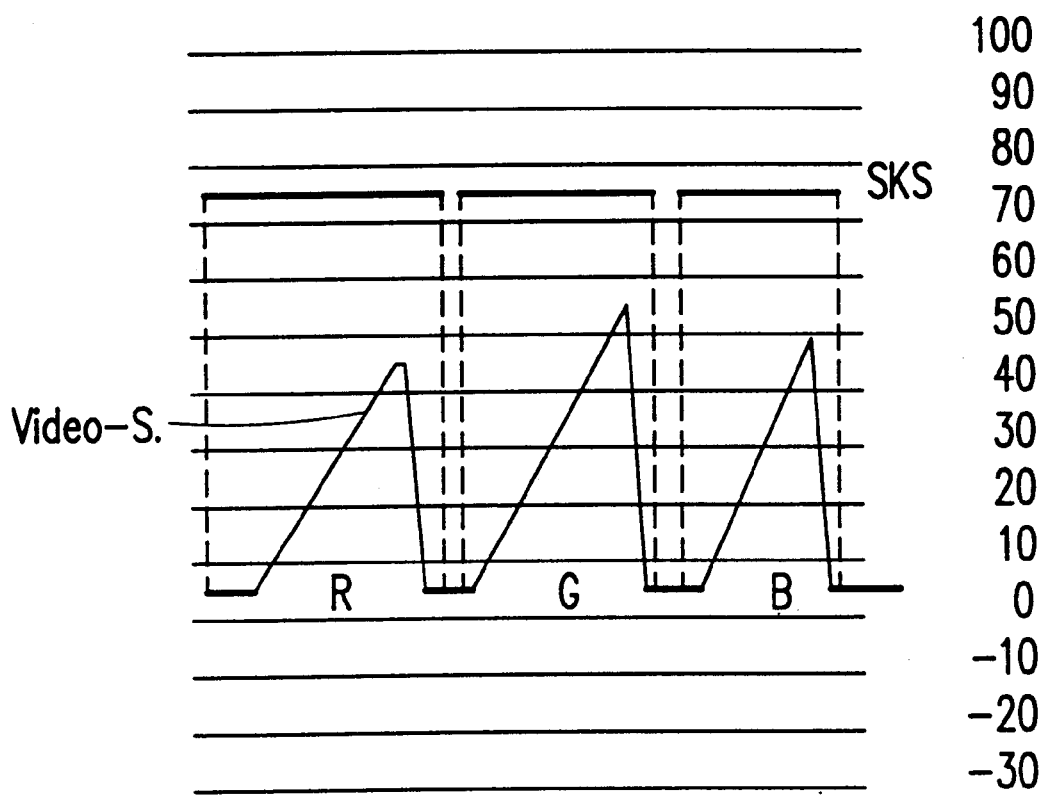
FIG. 2 shows an indication, changed by means of the invention, on the display screen of an oscilloscope.

After this operation of processing, the RGB video signals as well as the scaling signal SKS, these signals, which are still present in a digital form, are applied to a D/A converter 23, 24, from whose outputs M1', M2', M3' then the analog signals corresponding to the measured video signals and the associated scaling signal can be taken for their display on the display screen of the oscilloscope 25. These analog signals are applied to the inputs M1', M2', M3' and SKS' of a crossbar 26 shown in FIG. 1, which is switchable to the different inputs by means of a signal applied to the terminal MT, and whose output is connected to the oscilloscope 25 showing the signal characteristic curves. The RGB signals with the associated scaling signal line can either separately be displayed as R, G and B signals or simultaneously together as an RGB signal, as is shown in FIG. 2, of the selected video signal checkpoints, on the display screen of this oscilloscope 25.

After the digital signal processor 12, the digital video signal is applied to a signal distributing circuit 15 which has an input and two outputs. The digital video signal with the scaling signal SKS can be taken from the first output of the distributor circuit 15, which signal is applied to the subsequent D/A converter 16 for conversion into an analog video signal. An analog component signal R, G, B or Y, $C_R$, $C_B$ (without scaling signal SKS) can then be taken from the output 10 of the film scanner.

The digital video signal with the scaling signal SKS may also be taken from the second output of the circuit 15, which signal is applied to a scaling signal splitting stage 17 for separating the scaling signal SKS from the digital video signal. The digital scaling signal may also be applied from the splitting stage 17 to a further D/A converter 19 via a line memory 18. The optional line memory 18 is used for storing a plurality of the line-sequentially available scaling signals so as to vary or increase the luminance of the scaling signal line on the display screen of the oscilloscope 25 by means of line multiplication of the scaling signal.

For displaying the scaling signal SKS as well as the associated video signal on the display screen of the oscilloscope 25, the separated or extracted scaling signal SKS is applied by the D/A converter 19 to the input SKS' of the crossbar 26, which includes the signal generated by the pulse shaper 9 for information about the position of the scaling line and passed via a corresponding delay circuit 27, as well as the output signal of the input device 13 and the analog video signal which can be taken from the output 10. When switching the crossbar 26 to the different checkpoints M1 to M3 and 10 of the film scanner, the video signal of these different checkpoints and simultaneously, the once preselected or adjusted scaling signal line, can be displayed on the display screen of the oscilloscope 26 in accordance with FIG. 2, without having to switch continuously for comparing these two signals (video signal and scaling signal).

The evaluation may be performed in such a way that a scale is computed from the transmitted scaling signal SKS, which represents, for example the 100% level of the A/D converter 6, and is displayed on the display screen of the oscilloscope 25, or that simply only the scaling signal SKS is displayed with a reduced intensity. The computation of the scales from the scaling signal SKS may be performed in an analog or digital manner. The current drive reserve of the video signals may also be computed and displayed on a display screen.

Although a certain drive reserve is available in the video signal path from the 100% scaling value to the limit of the dynamic range (approximately 120%), all white limiters present in this video signal path must be monitored throughout the duration of the scaling signal SKS. When the scaling signal SKS is driven into its white limit due to manipulations of the control members 14, this state should be indicated. This may be effected, for example, by blinking the scaling signal line on the display screen of the oscilloscope 25 or by an indication on a display of the operating panel (not shown in FIG. 1) with an indication of the relevant control member (s). The rate of blinking preferably corresponds to the values of the scaling signal above the white limit.

Similarly as a scaling signal SKS can be inserted before the A/D converter 6, this is also possible at one or optionally many other positions in the amplification path so as to monitor the overdrive of given subsequent circuit parts in this amplification path. The choice of these different scaling signals may also be made by means of the operating panel. An indication shows which sections in the amplification path are monitored with the current scaling signal SKS.

Three video signals R, G, B are displayed as sawtooth signals and the associated scaling signal SKS is displayed as a line on the display screen of the oscilloscope 25 in FIG. 2. The relevant scaling signal SKS should represent the 100% value of the correspondingly driven sensor 4 or A/D converter 6 for the associated video signal R, G, or B. As can easily be seen, the amplitudes of the sawtooth signals R, G, B are still different. For a satisfactory color display, these differences in the color signal amplitudes should be compensated by setting the control members 14. The scaling signal line which is always simultaneously displayed and indicates the drive is very useful for this purpose.

What is claimed is:

1. A scanner comprising:
   means for converting contents of a film frame into a video signal,
   means for post-processing the video signal, and
   means for inserting a scaling signal into the video signal before post-processing the video signal.

2. The scanner of claim 1, further comprising:
   means for extracting the scaling signal from the video signal after processing and evaluating the extracted scaling signal, and
   means for displaying the extracted scaling signal together with the processed video signal.

3. The scanner of claim 1, in which the video signal is a digital video signal, and the scaling signal is a digital signal.

4. The scanner of claim 1, in which the video signal is an analog video signal, and the scaling signal is an analog signal.

5. The scanner of claim 1, further comprising means for monitoring the result of the post-processing operation.

6. The scanner of claim 3, in which the means for inserting the scaling signal includes:
   a multiplexer arranged in the digital video signal path and receiving the digital video signal and the digital scaling signal,
   a pulse shaper and
   a pulse generator for generating the scaling signal depending on the pulse shaper.

7. The scanner of claim 4, in which the means for inserting the scaling signal includes:
   a pulse shaper; and
   an analog inserter circuit with a pulse generator arranged in the analog video signal branch and controlled by a pulse shaper.

8. The scanner of claim 2, in which on a display of the means for displaying the scaling signal together with the video signal, a line representing the scaling signal blinks at rates corresponding to values of the scaling signal above a white limit.

9. The scanner of claim 2, in which the means for extracting and evaluating include:
   a signal distributing circuit arranged in the video signal branch, receiving the post-processed digital video signal, and applying the post-processed digital video signal to a D/A converter and to a scaling signal splitting stage in which the scaling signal is separated from the video signal; and
   a further D/A converter for receiving the digital scaling signal and for converting the digital scaling signal into an analog scaling signal.

10. The scanner of claim 9, in which the means for extracting and evaluating further includes a line memory for line multiplication arranged between the scaling signal splitting stage and the further D/A converter.

11. The scanner of claim 2, in which the means for extracting and evaluating includes:
   a scaling signal processing stage arranged in a measuring signal branch and receiving RGB signals from each video signal to be measured, and
   a subsequent D/A converter having an output from which the analog scaling signal is derived.

12. The scanner of claim 11, in which the means for extracting and evaluating further includes a selector arranged in the measuring signal branch and receiving measuring signals taken from given measuring points of a signal processor, each measuring signal being split up into the corresponding RGB signals which are each applied to a D/A converter for conversion into analog video signals.

13. The scanner of claim 12, in which the means for extracting and evaluating further includes a line memory arranged between the selector and the D/A converter and receiving the RGB signals for the purpose of line multiplication.

14. The scanner of claim 2, in which a scale displayed on a screen of the displaying means is an electronically generated scale computed in an analog or digital form from the scaling signal.

15. The scanner of claim 1 in which the means for post-processing processes the scaling signal inserted in the video signal in the same way as other portions of the video signal so that the condition of the scaling signal indicates the processing that has been performed on the video signal.

16. A telecine scanner comprising:
   means for converting the contents of film frames into a video signal,
   means for post-processing the video signal, and
   means for inserting a scaling signal into the video signal before post-processing the video signal.

17. A lantern slide scanner comprising:
   means for converting the contents of lantern slides into a video signal,
   means for post-processing the video signal, and
   means for inserting a scaling signal into the video signal before post-processing the video signal.

* * * * *